(12) United States Patent
Stelzig et al.

(10) Patent No.: US 11,689,248 B2
(45) Date of Patent: Jun. 27, 2023

(54) SYSTEM AND MODULES FOR COMMUNICATION

(71) Applicant: Siemens Aktiengesellschaft, Munich (DE)

(72) Inventors: Berthold Stelzig, Nuremberg (DE); Bo Xu, Chengdu (CN); Chang Sen Chen, Chengdu (CN)

(73) Assignee: Siemens Aktiengesellschaft, Munich (DE)

( * ) Notice: Subject to any disclaimer, the term of this patent is extended or adjusted under 35 U.S.C. 154(b) by 78 days.

(21) Appl. No.: 17/283,656

(22) PCT Filed: Oct. 10, 2018

(86) PCT No.: PCT/CN2018/109702
§ 371 (c)(1),
(2) Date: Apr. 8, 2021

(87) PCT Pub. No.: WO2020/073247
PCT Pub. Date: Apr. 16, 2020

(65) Prior Publication Data
US 2021/0359723 A1    Nov. 18, 2021

(51) Int. Cl.
*H04B 5/00* (2006.01)

(52) U.S. Cl.
CPC ................... *H04B 5/0081* (2013.01)

(58) Field of Classification Search
CPC .......... H04B 1/40; H04B 5/00; H04B 5/0025; H04B 5/0031; H04B 5/0075;
(Continued)

(56) References Cited

U.S. PATENT DOCUMENTS

| 8,362,587 B2 | 1/2013 | Sellatmamby et al. |
| 8,643,219 B2 | 2/2014 | Yabe et al. |

(Continued)

FOREIGN PATENT DOCUMENTS

| CN | 201663491 U | 12/2010 |
| CN | 202135126 U | * 2/2012 |

(Continued)

OTHER PUBLICATIONS

International Search Report PCT/ISA/210 for International Application No. PCT/CN2018/109702 dated May 31, 2019.

(Continued)

*Primary Examiner* — Quochien B Vuong
(74) *Attorney, Agent, or Firm* — Harness, Dickey & Pierce, P.L.C.

(57) ABSTRACT

Provided is a system for communication. The system includes: a basic function module; at least one extended function module; a first near-field communication transceiving unit and a first near-field communication antenna unit, located on the basic function module; and at least one second near-field communication transceiving unit and at least one second near-field communication antenna unit, located on each of the at least one extended function module. The first near-field communication antenna unit and the at least one second near-field communication antenna unit respectively comprise a first loop antenna and a second loop antenna which are printed on a printed circuit board.

21 Claims, 11 Drawing Sheets

(58) Field of Classification Search
CPC .. H04B 5/0081; H04B 5/0087; H04B 5/0093; H04B 5/02; H01Q 1/243; H01Q 1/36; H01Q 7/00

See application file for complete search history.

(56) References Cited

U.S. PATENT DOCUMENTS

| | | | |
|---|---|---|---|
| 8,977,196 B2* | 3/2015 | Cho | H01Q 1/243 |
| | | | 455/41.1 |
| 9,083,073 B2* | 7/2015 | Yang | H01Q 1/2216 |
| 9,564,943 B2 | 2/2017 | Leem | |
| 9,590,699 B1* | 3/2017 | Sankaran | H04W 4/80 |
| 9,729,210 B2* | 8/2017 | Jensen | H04B 5/0081 |
| 9,887,460 B2 | 2/2018 | Cheikh et al. | |
| 10,269,005 B2 | 4/2019 | Lee et al. | |
| 10,601,133 B2* | 3/2020 | Lee | H04B 5/0075 |
| 2012/0217658 A1 | 8/2012 | Kuroda | |
| 2014/0111389 A1* | 4/2014 | Jung | H01Q 21/29 |
| | | | 343/866 |
| 2014/0131843 A1 | 5/2014 | Balakrishnan et al. | |
| 2015/0162897 A1 | 6/2015 | Zachara | |
| 2016/0013681 A1 | 1/2016 | Liang et al. | |

FOREIGN PATENT DOCUMENTS

| | | |
|---|---|---|
| CN | 202135126 U | 2/2012 |
| CN | 104935839 A | 9/2015 |
| CN | 105049552 A | 11/2015 |
| CN | 105610470 A | 5/2016 |
| CN | 107453787 A | 12/2017 |
| EP | 2284849 A1 | 2/2011 |
| EP | 2733739 A2 | 5/2014 |
| EP | 3048666 A2 | 7/2016 |
| WO | WO 2008134889 A1 | 11/2008 |

OTHER PUBLICATIONS

Written Opinion PCT/ISA/237 for International Application No. PCT/CN2018/109702 dated May 31, 2019.
Chinese Office Action dated Aug. 18, 2021.

* cited by examiner

SYSTEM AND MODULES FOR COMMUNICATION

PRIORITY STATEMENT

This application is the national phase under 35 U.S.C. § 371 of PCT International Application No. PCT/CN2018/109702 which has an International filing date of Oct. 10, 2018, the entire contents of each of which are hereby incorporated herein by reference.

FIELD

The disclosure generally relates to the field of data communication, in particular to a system for communication.

BACKGROUND ART

Currently, communication between a basic function module and an extended function module in a communication system is implemented by using a standard serial peripheral interface (SPI). In the communication system 100, connectors (for example, SPIs 130-1, 130-2, . . . , 130-N) usually need to be used for physical connections between a basic function module 110 and an extended function module 120 and between two adjacent extended function modules (for example, between extended function modules 120-1 and 120-2, between extended function modules 120-2 and 120-3, . . . , and between extended function modules 120-N-1 and 120-N), as shown in FIG. 1. In this case, it is inconvenient for the user to connect or disconnect the connectors. In addition, since the connections are wired connections, a connection between a high-voltage module and a low-voltage module is forbidden for the sake of safety. Thus, the types of extended function modules suitable for being connected for communication will be restricted. For example, when the basic function module is a high-voltage module, an extended function module must also be a high-voltage module, and when the basic function module is a low-voltage module, an extended function module must also be a low-voltage module.

SUMMARY

In view of this, the disclosure provides a system and modules for communication. By using the system provided by at least one embodiment of the disclosure, installing near-field communication transceiver units respectively on the basic function module and extended function modules and using the antenna units realized by loop antennas on printed circuit boards to implement near-field communication, near-field communication between the basic function module and an extended function module and between extended function modules can be implemented, without any necessity of using connectors for wired communication.

According to one embodiment of the disclosure, a system for communication is provided, and the system comprises a basic function module, at least one extended function module, a first near-field communication transceiver unit and a first near-field communication antenna unit located on the basic function module, and at least one second near-field communication transceiver unit and at least one second near-field communication antenna unit located on each extended function module of the at least one extended function module, wherein the first near-field communication antenna unit and the at least one second near-field communication antenna unit respectively comprise a first loop antenna and a second loop antenna printed on a printed circuit board.

According to another embodiment of the disclosure, an extended function module is provided and the extended function module comprises at least one second near-field communication transceiver unit and at least one second near-field communication antenna unit, wherein the at least one second near-field communication antenna unit comprises a second loop antenna printed on a printed circuit board.

According to another embodiment of the disclosure, a basic function module is provided and the basic function module comprises a first near-field communication transceiver unit and a first near-field communication antenna unit, wherein the first near-field communication antenna unit comprises a first loop antenna printed on a printed circuit board.

BRIEF DESCRIPTION OF THE DRAWINGS

The essence and advantages of the disclosure may be further understood by reference to the drawings. In the drawings, similar components or characteristics may have the same reference numerals.

Figure 1:
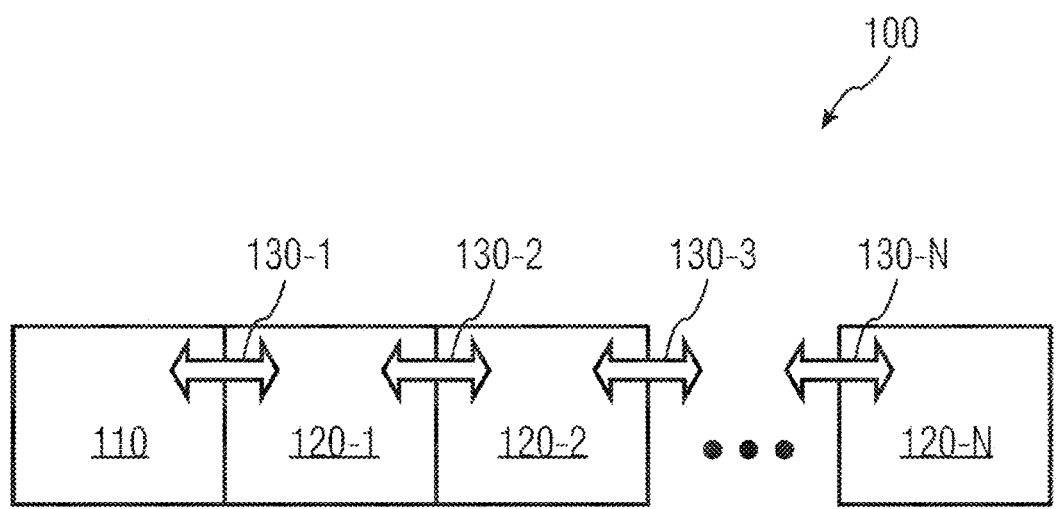
FIG. 1 is a schematic diagram of communication between the basic function module and extended function modules in a prior communication system.

DESCRIPTION OF REFERENCE NUMERALS
IN THE DRAWINGS

100: Communication system
110: Basic function module
120-1, 120-2, . . . , 120-N: Extended function module
130-1, 130-2, . . . , 130-N: SPI
200: Communication system
210: Basic function module
220-1, 220-2, 220-3: Extended function module
230: First near-field communication transceiver unit
240-1, 240-2, 240-3: Second near-field communication transceiver unit
250: First near-field communication antenna unit
260-1, 260-2, 260-3: Second near-field communication antenna unit
270-1, 270-2, 270-3: Communication destination determination unit
280: Main printed circuit board
200': Communication system
250': First near-field communication antenna unit
260'-1-L, 260'-2-L, 260'-3-L: Second near-field communication antenna unit on the left of the first extended function module to third extended function module
260'-1-R, 260'-2-R, 260'-3-R: Second near-field communication antenna unit on the right of the first extended function module to third extended function module
251', 261-1-L, 261-1-R: Mutual-inductance element
252, 252': First loop antenna
262, 262-1, 262'-1-R: Second loop antenna
253': First printed circuit board
263'-1-R: Second printed circuit board
254': First flexible printed circuit board
255': First frame board
256': First connecting mechanism
264'-1-R: Second flexible printed circuit board
265': Second frame board
266': Second connecting mechanism

DETAILED DESCRIPTION OF THE EXAMPLE
EMBODIMENTS

According to one embodiment of the disclosure, a system for communication is provided, and the system comprises a basic function module, at least one extended function module, a first near-field communication transceiver unit and a first near-field communication antenna unit located on the basic function module, and at least one second near-field communication transceiver unit and at least one second near-field communication antenna unit located on each extended function module of the at least one extended function module, wherein the first near-field communication antenna unit and the at least one second near-field communication antenna unit respectively comprise a first loop antenna and a second loop antenna printed on a printed circuit board.

According to another embodiment of the disclosure, an extended function module is provided and the extended function module comprises at least one second near-field communication transceiver unit and at least one second near-field communication antenna unit, wherein the at least one second near-field communication antenna unit comprises a second loop antenna printed on a printed circuit board.

According to another embodiment of the disclosure, a basic function module is provided and the basic function module comprises a first near-field communication transceiver unit and a first near-field communication antenna unit, wherein the first near-field communication antenna unit comprises a first loop antenna printed on a printed circuit board.

By using the system provided by at least one embodiment of the disclosure, installing near-field communication transceiver units respectively on the basic function module and extended function modules and using the antenna units realized by loop antennas on printed circuit boards to implement near-field communication, near-field communication between the basic function module and an extended function module and between extended function modules can be implemented, without any necessity of using connectors for wired communication.

By using the system provided by at least one embodiment of the disclosure and configuring the first loop antenna and the second loop antenna into wiring loops formed by performing loop wiring along two side edges of corresponding printed circuit boards, the distance between the near-field communication antenna units on two adjacent function modules can be kept within a set communication distance, and in addition interference caused by other function modules during communication between two adjacent extended function modules can be reduced.

By using the system provided by at least one embodiment of the disclosure and configuring the first loop antenna and the second loop antenna to have the same/a similar loop shape and/or to be parallel to each other, the communication effect between two adjacent function modules can be improved.

By using the system provided by at least one embodiment of the disclosure and determining the sizes and/or shapes of the first loop antenna and the second loop antenna according to the set communication distance, the near-field communication effect between two adjacent function modules can effectively be improved.

By using the system provided by at least one embodiment of the disclosure, arranging the first near-field communication antenna unit and the second near-field communication antenna unit along a line and arranging the distance between the near-field communication antenna units on two adjacent function modules within the set communication distance, near-field communication between two adjacent function modules can be implemented and the communication effect between two adjacent function modules can be improved.

By using the system provided by at least one embodiment of the disclosure, forming a single first loop antenna on the printed circuit board on the basic function module as a first near-field communication antenna unit, forming a single second loop antenna on the printed circuit board on each extended function module as corresponding at least one second near-field communication antenna unit, and keeping the printed circuit boards on the basic function module and the extended function modules on a plane, the near-field communication effect between two adjacent function modules can effectively be improved, and in addition interference caused by other function modules during communication between two adjacent extended function modules can be reduced.

By using the system provided by at least one embodiment of the disclosure, using a single near-field communication antenna unit formed on one side of the printed circuit board on the basic function module as a first near-field communication antenna unit, and using two near-field communication antenna units formed on two sides of the printed circuit board on the extended function module as at least one second near-field communication antenna unit, the near-field communication effect between two adjacent function modules can effectively be improved, and in addition interference caused by other function modules during communication between two adjacent extended function modules can be reduced.

By using the system provided by at least one embodiment of the disclosure and installing a communication destination determination unit for determining the destination function module of downstream communication on each extended function module, cascades between the basic function module and at least one extended function module can be implemented for communication, direct mutual communication is allowed only between adjacent function modules of the cascaded function modules, and thus interference caused by other function modules during communication between two adjacent extended function modules can be reduced.

Now, the subject described in this document is discussed by reference to exemplary implementation modes. It should be understood that the discussions about these implementation modes are only intended to let those skilled in the art have a better understanding so as to realize the subject described in this document, but are not intended to restrict the scope of protection, applicability, or examples described in the claims. Changes can be made to the functions and arrangements of the discussed elements, without departing from the scope of protection of the disclosure. Various processes or components can be omitted, replaced, or added in different examples, as required. For example, the described method can be executed in a sequence different from what is described, and steps can be added, omitted or combined. In addition, the characteristics described in relation to some examples can also be combined in other examples.

As used in this document, the term "comprise" and its variants are open terms and mean "include but are not limited to." The term "based on" means "at least partially based on." The term "one embodiment" means "at least one embodiment." The term "another embodiment" means "at least one other embodiment." The terms "first" and "second" may refer to different or identical objects. Other definitions, explicit or implicit, may be included below. Unless otherwise specified in the context, the definition of a term is consistent throughout the description.

Figure 2:
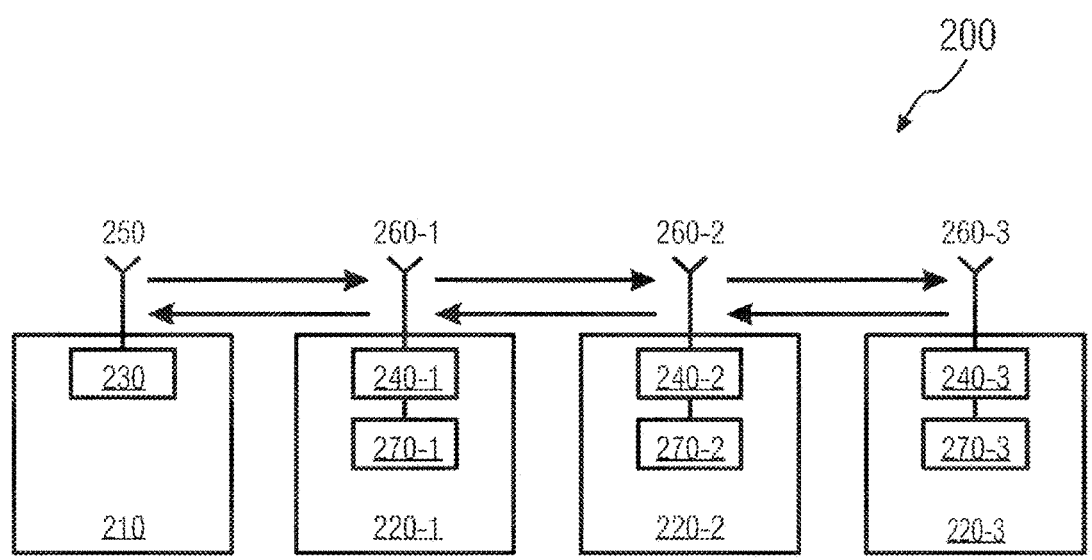
FIG. 2 is a schematic diagram of the system for communication according to a first embodiment of the disclosure.

FIG. 2 is a schematic diagram of the system 200 for communication (referred to as communication system 200 hereinafter) according to a first embodiment of the disclosure.

As shown in FIG. 2, the communication system 200 comprises a basic function module 210 and at least one extended function module. Three extended function modules 220-1, 220-2 and 220-3 are shown in the example in FIG. 2. The basic function module 210 is used to implement the basic functions of the communication system 200, and the basic function module may be, for example, the main control module of a programmable logic controller (PLC). Extended function modules are used to implement extended functions of the communication system 200. Extended function modules may be, for example, extended input/output (I/O) modules of a PLC and the purpose of extended function modules is to extend I/O points of the basic function module. In the disclosure, the communication system may be used to transmit I/O data of a PLC.

Communication between the basic function module and an extended function module mainly enables the basic function module to implement the setting of the output port of the extended function module and the collection of the state of the input port of the extended function module. Data sent from the basic function module may be addressed to a specific extended function module or addressing of the data may be implemented in shared data structure mode. On the contrary, data sent back from an extended function module may be data sent from a specific extended function module and containing the address of the extended function module, or may also be data returned to the basic function module after a specific position is filled in the shared data structure of the extended function modules.

The basic function module 210 comprises a first near-field communication transceiver unit 230 and a first near-field communication antenna unit 250. The first near-field communication transceiver unit 230 is electrically connected with the first near-field communication antenna unit 250. For example, the first near-field communication transceiver unit 230 and the first near-field communication antenna unit 250 can implement electrical communication in electrical connection mode through wiring on the printed circuit board. The first near-field communication transceiver unit 230 is used to process wireless communication signals received by the first near-field communication antenna unit 250 to convert them to signals that the basic function module 210 can identify and process, or to convert data to be sent in the basic function module 210 to wireless communication signals suitable for the first near-field communication antenna unit 250 to send and then send them out through the first near-field communication antenna unit 250. In the disclosure, the first near-field communication transceiver unit 230 can be, for example, any suitable communication transceiver. The first near-field communication antenna unit 250 is used to send or receive wireless communication signals in near-field communication mode. The first near-field communication antenna unit 250 comprises a first loop antenna 252 printed on a printed circuit board. Here, the printed circuit board may be the main printed circuit board of the basic function module 210, or may also be a printed circuit board other than the main printed circuit board of the basic function module 210.

Each extended function module comprises at least one second near-field communication transceiver unit and at least one second near-field communication antenna unit. Similarly, the at least one second near-field communication transceiver unit is electrically connected with the corresponding second near-field communication antenna unit. For example, the second near-field communication transceiver unit and the second near-field communication antenna unit can implement electrical communication in electrical connection mode through wiring on the printed circuit board. In the example shown in FIG. 2, each extended function module has a single second near-field communication antenna unit. For example, the first extended function module 220-1 has a second near-field communication antenna unit 260-1, the second extended function module 220-2 has a second near-field communication antenna unit 260-2 and the third extended function module 220-3 has a second near-field communication antenna unit 260-3. The second near-field communication antenna unit comprises a second loop antenna printed on a printed circuit board. Here, the printed circuit board may be the main printed circuit board of an extended function module, or may also be a printed circuit board other than the main printed circuit board of an extended function module.

Figure 3:
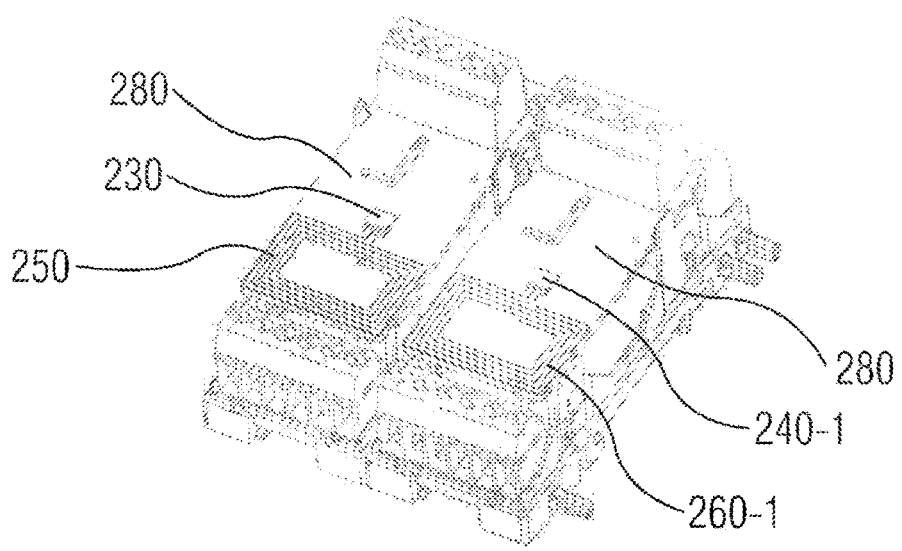
FIG. 3 is a schematic diagram of one implementation example of the system for communication according to the first embodiment of the disclosure.

FIG. 3 is a schematic diagram of one implementation example of the system for communication according to the first embodiment of the disclosure. Only the basic function module 210 and the first extended function module 220-1 are shown in the communication system in FIG. 3.

In the communication system shown in FIG. 3, the first near-field communication antenna unit 250 is a single first loop antenna 252 formed on the main printed circuit board 280 of the basic function module 210. At least one second near-field communication antenna unit is a single second loop antenna formed on the main printed circuit board of a corresponding extended function module, for example, a single second loop antenna 262-1 formed on the main printed circuit board of the first extended function module 220-1. In addition, the basic function module 210 and the extended function modules are so arranged that the communication distance between two near-field communication antenna units on two adjacent function modules is within the set near-field communication distance, the main printed circuit boards on the basic function module 210 and the extended function modules are parallel to each other, and the height difference between the planes where the main printed circuit boards on two adjacent modules are located is less than a preset threshold. In this document, the preset threshold is determined based on the set near-field communication distance. In one example of the disclosure, the main printed circuit boards may be located on a plane, for example.

Figure 4:
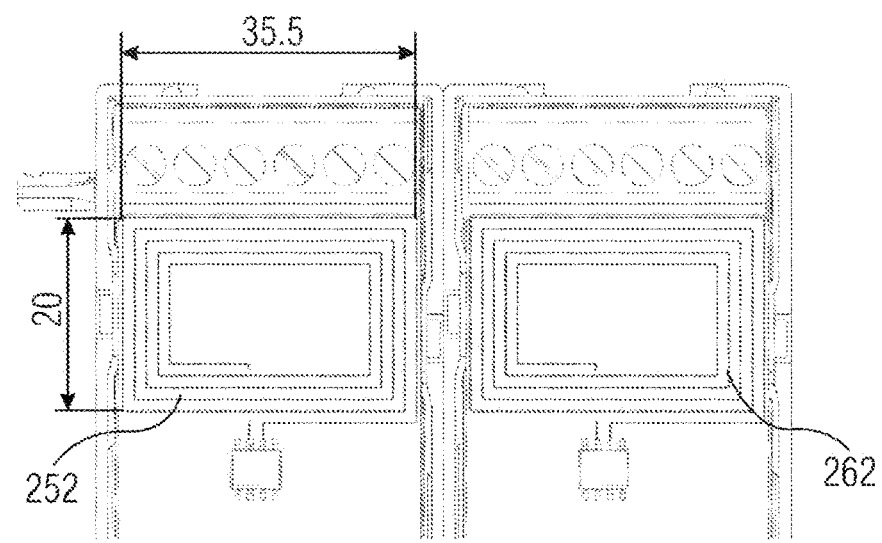
FIG. 4 is a schematic diagram of an example of near-field communication antenna units formed on a function module according to the first embodiment of the disclosure.

In addition, alternatively, each of the first loop antenna 252 and the second loop antenna 262 may be formed by performing loop wiring along two side edges of a corresponding printed circuit board to form a wiring loop, as shown in FIGS. 3 and 4.

In addition, in an example of the embodiment, the first loop antenna 252 and the second loop antenna 262 are configured to have the same/a similar loop shape. In addition, the first loop antenna 252 and the second loop antenna 262 may be configured to be parallel to each other.

FIG. 4 is a schematic diagram of an example of near-field communication antenna units formed on a function module according to the first embodiment of the disclosure. As shown in FIG. 4, the size of the formed loop antennas is 35.5 cm×20 cm. In other examples of the disclosure, the size of the loop antennas may also be other suitable sizes. The sizes and/or shapes of the first loop antenna 252 and the second loop antenna 262 may be determined according to the set near-field communication distance. In one example of the disclosure, the set near-field communication distance may be set to 1 cm to 2 cm. In one example of the disclosure, the first loop antenna 252 and the second loop antenna 262 may be formed by use of copper wiring on the printed circuit boards. In other examples of the disclosure, the first loop antenna 252 and the second loop antenna 262 may be formed by use of wiring of other conductive materials on the printed circuit boards.

In another example of the disclosure, the communication system may comprise at least two extended function modules. According to the embodiments of the disclosure, the basic function module 210 may be cascaded with the extended function modules, and near-field communication mode is adopted between function modules to implement cascade communication, that is to say, the basic function module 210 communicates with the first extended function module 220-1, the first extended function module 220-1 communicates with the second extended function module 220-2, and the second extended function module 220-2 communicates with the third extended function module 220-3. In this way, data of the basic function module 210 can be sent to the first extended function module 220-1, the second extended function module 220-2 and the third extended function module 220-3 in turn in near-field communication mode. Similarly, data of the third extended function module 220-3 may also be sent to the second extended function module 220-2, the first extended function module 220-1 and the basic function module 210 in turn in near-field communication mode.

Accordingly, each of the at least two extended function modules comprises a communication destination determination unit for determining the destination function module of downstream communication according to the data source of data to be sent in the extended function module. For example, the first extended function module 220-1 and the second extended function module 220-2 have the communication destination determination unit 270-1 and the communication destination determination unit 270-2, respectively. The communication destination determination unit 270-1 is used to determine the destination function module of downstream communication happening at the first extended function module 220-1 according to the data source of received data in the first extended function module 220-1. For example, when the received data on the first extended function module 220-1 comes from the basic function module 210, the destination function module of downstream communication happening at the first extended function module 220-1 is the second extended function module 220-2, that is to say, data received from the basic function module 210 is forwarded to the second extended function module 220-2. When the received data on the first extended function module 220-1 comes from the second extended function module 220-2, the destination function module of downstream communication happening at the first extended function module 220-1 is the basic function module 210, that is to say, data received from the second extended function module 220-2 is forwarded to the basic function module 210. Similarly, the communication destination determination unit 270-2 is used to determine the destination function module of downstream communication happening at the second extended function module 220-2 according to the data source of received data in the second extended function module 220-2.

In one example of the disclosure, the communication destination determination unit may be any mechanism having a corresponding capability, or any processor, field programmable gate array (FPGA), integrated circuit or single-chip microcomputer having a corresponding capability.

In one example of the disclosure, the data source of data to be sent may be identified by use of identification information, and in addition the identification information is sent together with the data to be sent to a corresponding extended function module. Thus, the communication destination determination unit may determine the data source of data to be sent according to the received identification information.

In one example of the disclosure, the first near-field communication antenna unit 250 and the at least one second near-field communication antenna units 260-1, 260-2, and 260-3 may be configured to be arranged along a line, and the distance between the near-field communication antenna units on two adjacent function modules is within the set near-field communication distance. In one example of the disclosure, the set near-field communication distance may be set to 1 cm to 2 cm. In another example of the disclosure, the set communication distance may be set to other proper distances according to the specific situation.

Figure 5:
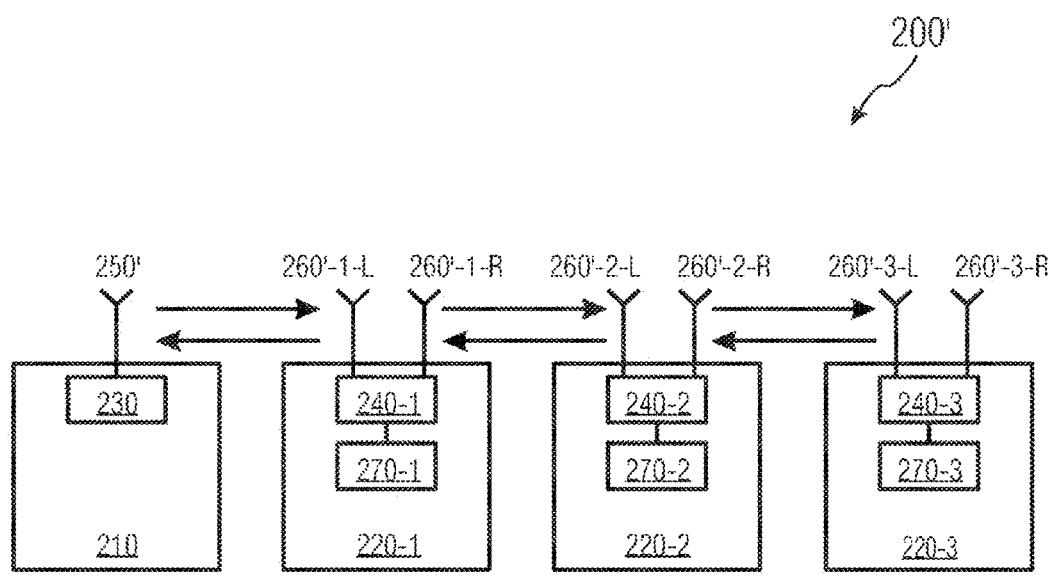
FIG. 5 is a schematic diagram of the system for communication according to a second embodiment of the disclosure.

FIG. 5 is a schematic diagram of the system for communication (referred to as communication system 200' hereinafter) according to a second embodiment of the disclosure. The embodiment shown in FIG. 5 is an improvement of the embodiment shown in FIG. 2, and the difference is that the extended function modules in FIG. 5 each have two near-field communication antenna units, instead of a single near-field communication antenna unit. The other components shown in FIG. 5 are the same as the other components shown in FIG. 2, and they will not be described here again.

In the example shown in FIG. 5, each extended function module has two near-field communication antenna units. For example, the first extended function module 220-1 has two second near-field communication antenna units 260'-1-L and 260'-1-R, the second extended function module 220-2 has two second near-field communication antenna units 260'-2-L and 260'-2-R, and the third extended function module 220-3 has two second near-field communication antenna units 260'-3-L and 260'-3-R. The two near-field communication antenna units on each extended function module are respectively located at the side edges, namely left edge and right edge, of the printed circuit board on the extended function module. In the embodiment, the basic function module has one near-field communication antenna unit and the near-field communication antenna unit is located at one side edge of the printed circuit board on the basic function module.

When the system works, the near-field communication antenna unit on each side of an extended function module communicates with a corresponding near-field communication antenna unit on an adjacent function module. For example, when the basic function module 210 and extended function modules are placed in turn from left to right, the first near-field communication antenna unit 250' on the basic function module 210 is located on the right side of the main printed circuit board on the basic function module 210. The first near-field communication antenna unit 250' on the basic function module 210 communicates with the second near-field communication antenna unit 260'-1-L on the left side of the first extended function module 220-1 and is used to send data from the basic function module 210 to the second near-field communication antenna unit 260'-1-L or receive data from the second near-field communication antenna unit 260'-1-L. Accordingly, the second near-field communication antenna unit 260'-1-R on the right side of the first extended function module 220-1 communicates with the second near-field communication antenna unit 260'-2-L on the left side of the second extended function module 220-2 and is used to send data from the first extended function module 220-1 to the second near-field communication antenna unit 260'-2-L or receive data from the second near-field communication antenna unit 260'-2-L. Alike, the near-field communication antenna units on the other extended function modules communicate with corresponding near-field communication antenna units in a similar way. In the embodiment, alike, the first near-field communication antenna unit 250' and the at least one second near-field communication antenna units 260'-1, 260'-2, and 260'-3 are configured to be arranged along a line, and the distance between the near-field communication antenna units on two adjacent function modules is within the set near-field communication distance.

Figure 6A:
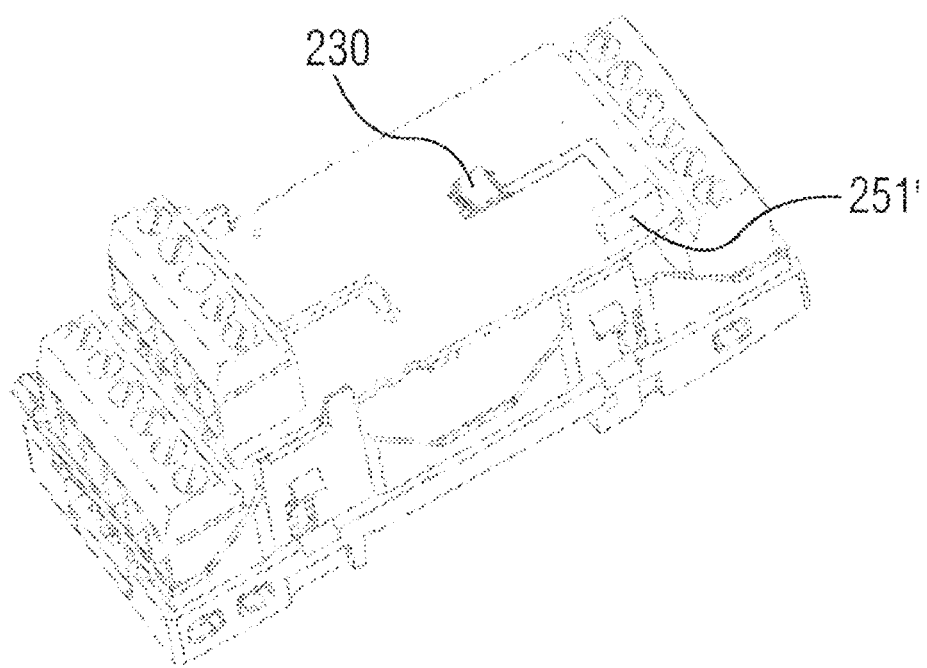
FIG. 6A is a schematic diagram of one implementation example of the first near-field communication antenna unit in the system for communication according to the second embodiment of the disclosure.
Figure 6B:
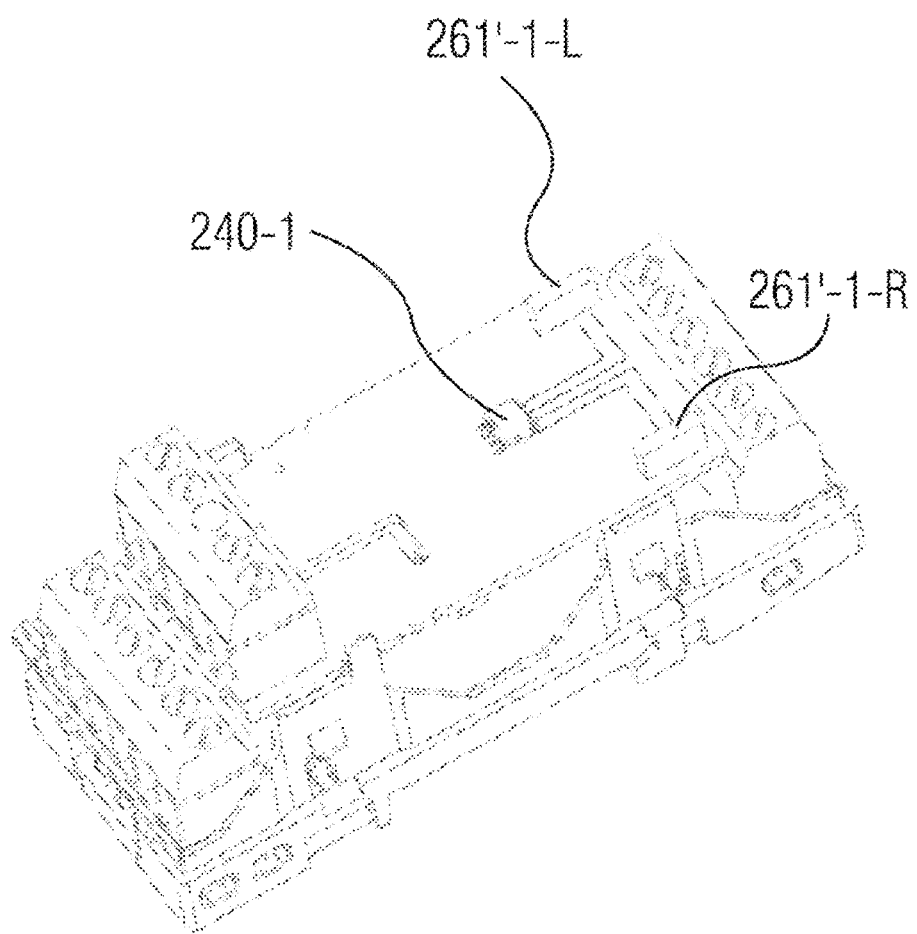
FIG. 6B is a schematic diagram of one implementation example of a second near-field communication antenna unit in the system for communication according to the second embodiment of the disclosure.

FIG. 6A is a schematic diagram of one implementation example of a first near-field communication antenna unit 250' in the communication system 200' according to the second embodiment of the disclosure. FIG. 6B is a schematic diagram of one implementation example of a second near-field communication antenna unit 260'-1 in the communication system according to the second embodiment of the disclosure. As shown in FIGS. 6A and 6B, the first near-field communication antenna unit 250' may be formed by use of one mutual-inductance element 251', and the second near-field communication antenna units 260' may be formed by use of two mutual-inductance elements 261'. Alternatively, in one example, the mutual-inductance element may be at least one of the following: inductor or inductance coil.

Figure 7A:
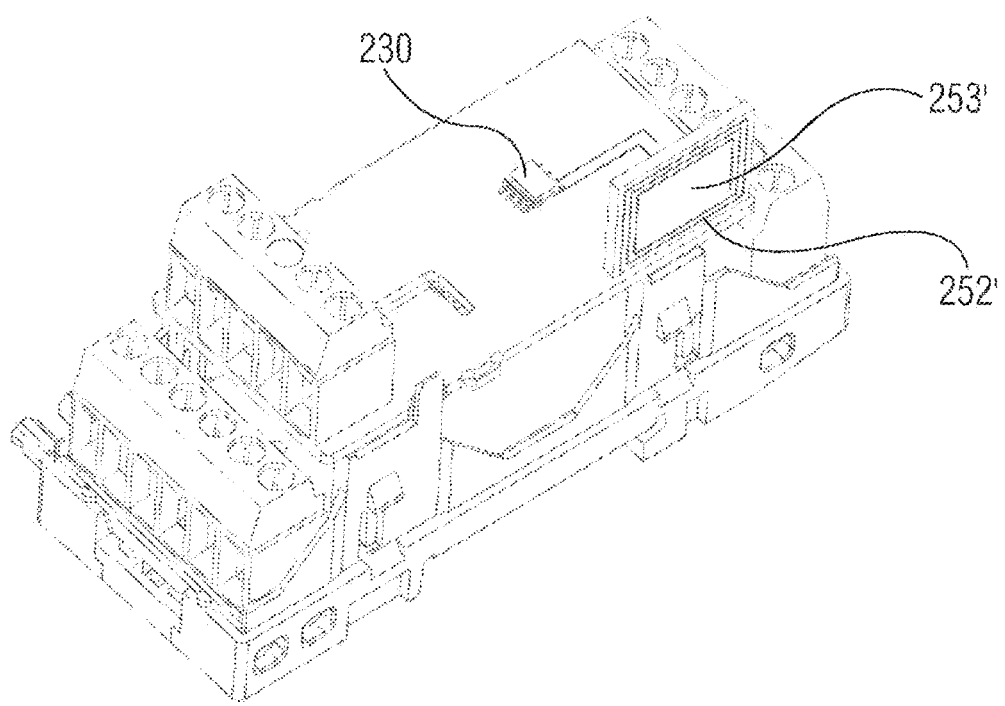
FIG. 7A is a schematic diagram of another implementation example of the first near-field communication antenna unit in the system for communication according to the second embodiment of the disclosure.
Figure 7B:
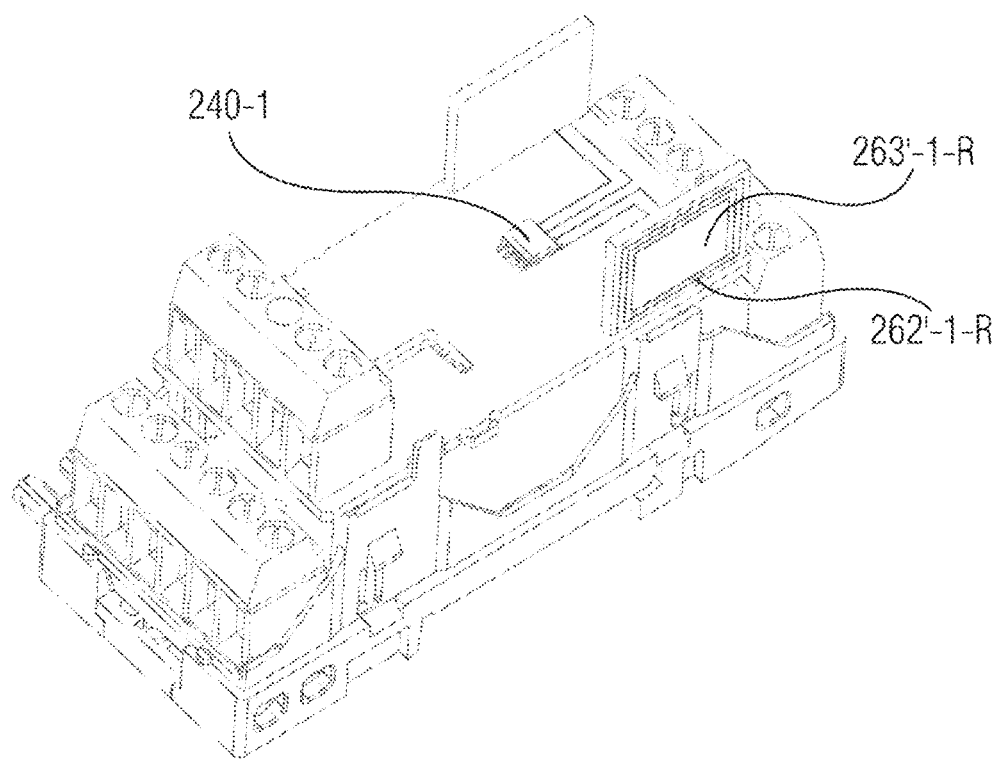
FIG. 7B is a schematic diagram of another implementation example of a second near-field communication antenna unit in the system for communication according to the second embodiment of the disclosure.

FIG. 7A is a schematic diagram of another implementation example of the first near-field communication antenna unit 250' in the communication system 200' according to the second embodiment of the disclosure, and FIG. 7B is a schematic diagram of another implementation example of the second near-field communication antenna unit 260'-1 in the communication system 200' according to the second embodiment of the disclosure.

As shown in FIGS. 7A and 7B, the first near-field communication antenna unit 250' comprises a first printed circuit board 253' printed with a first loop antenna 252' thereon and the first printed circuit board 253' is vertically fixed at one side edge of the main printed circuit board on the basic function module 210. The second near-field communication antenna unit 260'-1 comprises two second printed circuit boards 263' printed with a second loop antenna 262' thereon and the two second printed circuit boards 263' are vertically fixed at two side edges of the main printed circuit board on the extended function module 220-1. In the example shown in FIGS. 7A and 7B, the first near-field communication antenna unit 250' is electrically connected with the first near-field communication transceiver unit 230. For example, an electrical communication interface electrically connected with the first near-field communication antenna unit 250' is provided at the edge of the first printed circuit board 253' and an electrical communication interface electrically connected with the first near-field communication transceiver unit 230 is also provided at the corresponding side edge of the main printed circuit board of the basic function module 210. When the first printed circuit board 253' is vertically fixed at one side edge of the main printed circuit board of the basic function module 210, the two electrical communication interfaces are coupled to implement electrical communication between two printed circuit boards. Alike, an electrical connection between the second near-field communication antenna unit and the second near-field communication transceiver unit is implemented in a similar way to implement electrical communication.

Alike, in the example shown in FIGS. 7A and 7B, each of the first loop antenna 252' and the second loop antenna 262' may be formed by performing loop wiring along two side edges of a corresponding printed circuit board to form a wiring loop. In addition, the first loop antenna 252' and the second loop antenna 262' may be configured to have the same/a similar loop shape. In addition, the first loop antenna and the second loop antenna may be configured to be parallel to each other. The size of the formed loop antenna may be 35.5 cm×20 cm. In other examples of the disclosure, the size of the loop antennas may also be other suitable sizes. The sizes and/or shapes of the first loop antenna and the second loop antenna may be determined according to the set near-field communication distance. In one example of the disclosure, the first loop antenna and the second loop antenna may be formed by use of copper wiring on the printed circuit boards. In other examples of the disclosure, the first loop antenna and the second loop antenna may be formed by use of wiring of other conductive materials on the printed circuit boards.

Figure 8A:
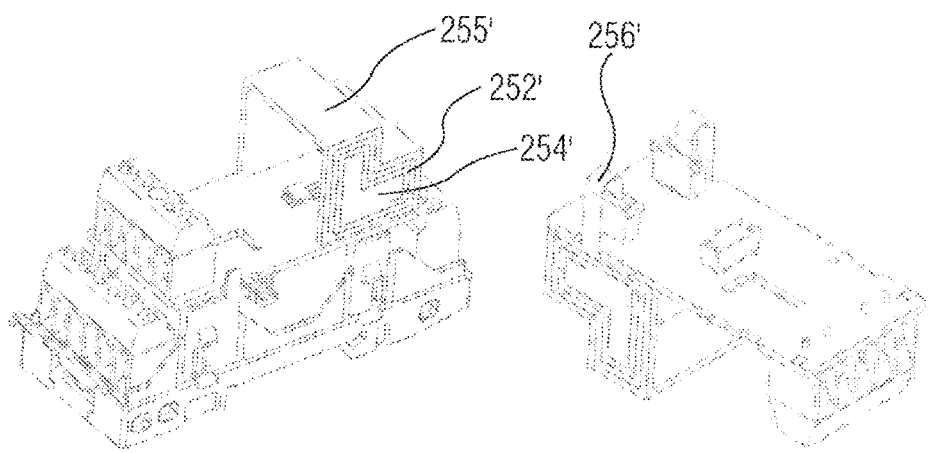
FIG. 8A is a schematic diagram of a further implementation example of a first near-field communication antenna unit in the system for communication according to the second embodiment of the disclosure.
Figure 8B:
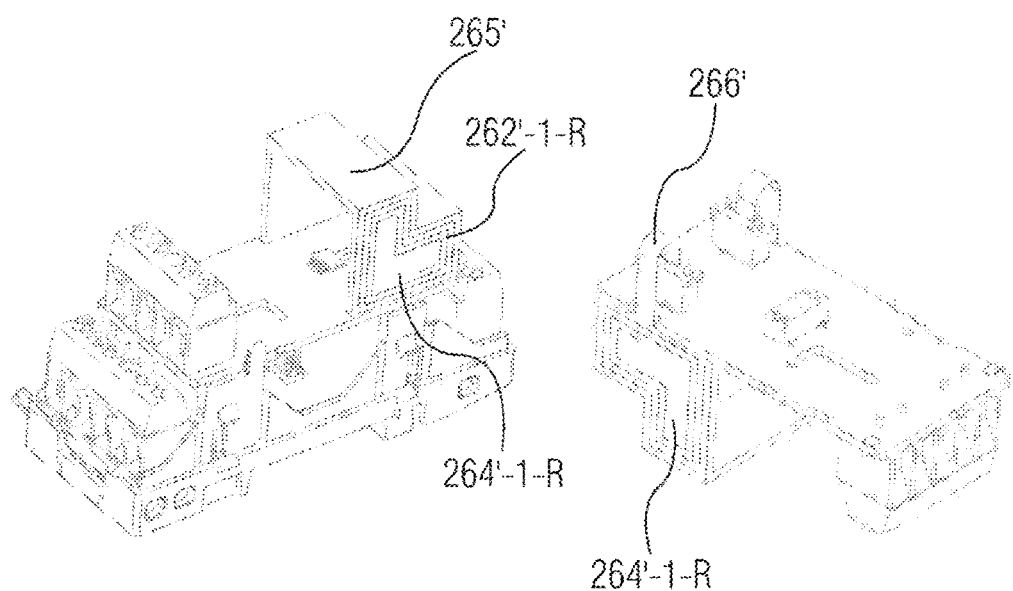
FIG. 8B is a schematic diagram of a further implementation example of a second near-field communication antenna unit in the system for communication according to the second embodiment of the disclosure.

FIG. 8A is a schematic diagram of a further implementation example of the first near-field communication antenna unit 250' in the communication system 200' according to the second embodiment of the disclosure, and FIG. 8B is a schematic diagram of a further implementation example of the second near-field communication antenna unit 260'-1 in the communication system 200' according to the second embodiment of the disclosure.

As shown in FIGS. 8A and 8B, the first near-field communication antenna unit 250' may comprise a first frame board 255' with a first flexible printed circuit board 254' attached on one side and two first connecting mechanisms 256', the first frame board 255' is vertically fixed by use of the two first connecting mechanisms 256' at two side edges of the main printed circuit board of the basic function module 210, and a first loop antenna 252' is printed on the first flexible printed circuit board 254'. The at least one second near-field communication antenna unit may comprise a second frame board 265' with a second flexible printed circuit board 264' respectively attached on two opposite side surfaces and two second connecting mechanisms 266', and the second frame board 265' is vertically fixed by use of the two second connecting mechanisms 266' at two side edges of the main printed circuit board of a corresponding extended function module. Alike, a second loop antenna 262' is printed on the second flexible printed circuit board 264'. In the example shown in FIGS. 8A and 8B, an electrical connection and electrical communication between the first near-field communication antenna unit 250' and the first near-field communication transceiver unit 230 may be implemented in the way shown in FIGS. 7A and 7B. Alike, an electrical connection and electrical communication between the second near-field communication antenna unit and the second near-field communication transceiver unit may also be implemented in the way shown in FIGS. 7A and 7B.

In the example, the first frame board 255' and the second frame board 265' are configured to respectively match the shapes of the casings of the basic function module 210 and a corresponding extended function module 220, and are fixed on the casings.

Alike, in the example shown in FIGS. 8A and 8B, each of the first loop antenna 252' and the second loop antenna 262' may be formed by performing loop wiring along two side edges of a corresponding printed circuit board to form a wiring loop. In addition, the first loop antenna 252' and the second loop antenna 262' may be configured to have the same/a similar loop shape. In addition, the first loop antenna and the second loop antenna may be configured to be parallel to each other. The size of the formed loop antenna may be 35.5 cm×20 cm. In other examples of the disclosure, the size of the loop antennas may also be other suitable sizes. The sizes and/or shapes of the first loop antenna 252' and the second loop antenna 262' may be determined according to the set near-field communication distance. In one example of the disclosure, the first loop antenna 252' and the second loop antenna 262' may be formed by use of copper wiring on the printed circuit boards. In other examples of the disclosure, the first loop antenna 252' and the second loop antenna 262' may be formed by use of wiring of other conductive materials on the printed circuit boards.

In addition, when two near-field communication antenna units and a single near-field communication transceiver unit exist on an extended function module, the near-field communication transceiver unit may be configured to have two wiring interfaces, and each wiring interface is respectively electrically connected with a near-field communication antenna unit. Or, a switch may be placed between the near-field communication transceiver unit and the two near-field communication antenna units, and thus an electrical connection and electrical communication between the near-field communication transceiver unit and a corresponding near-field communication antenna unit is implemented based on the determination result of the communication destination determination unit on the extended function module.

In addition, other variations can be made to the embodiment shown in FIG. 5. For example, each extended function module may have two near-field communication transceiver units and each near-field communication transceiver unit corresponds to a second near-field communication antenna unit.

The embodiments described above in combination with the drawings are only exemplary embodiments, but do not represent all embodiments that can be realized or fall within the scope of protection of the claims. The term "exemplary" used in the whole description means "used as an example, instance or illustration", but does not mean "preferable" to or "advantageous" over other embodiments. For the purpose of providing an understanding of the described techniques, the embodiments cover specific details. However, these techniques may be carried out without these specific details. In some embodiments, well-known structures and devices are shown in the form of a block diagram to avoid the difficulty in understanding the concepts in the described embodiments.

The above-mentioned description of the present disclosure is provided so that those skilled in the art can realize or use the present disclosure. Various modifications to the present disclosure are apparent to those skilled in the art, and in addition the general principle defined in this document can be applied to other variants, without departing from the scope of protection of the present disclosure. Therefore, the present disclosure is not limited to the examples and designs in this document, but is consistent with the widest scope of the principle and novelty characteristics disclosed in this document.

The invention claimed is:

1. A system for communication, comprising:
a basic function module;
at least one extended function module;
a first near-field communication transceiver and a first near-field communication antenna, located on the basic function module, the first near-field communication antenna including a first loop antenna and a main printed circuit board; and
at least one second near-field communication transceiver and at least one second near-field communication antenna located an each respective at least one extended function module, each of the at least one second near-field communication antenna including a second loop antenna and a main printed circuit board;
wherein planes where the main printed circuit boards on the basic function module and the extended function modules are located are parallel to each other, a height difference between the planes where the main printed circuit boards on two adjacent modules are located is less than a threshold, and the threshold is based on a set near-field communication distance.

2. The system of claim 1, wherein each of the first loop antenna and the second loop antenna is a wiring loop formed by loop wiring along two side edges of a corresponding printed circuit board.

3. The system of claim 2, wherein the first loop antenna and the second loop antenna at least one of have a same or similar loop shape or are parallel to each other.

4. The system of claim 2, wherein at least one of sizes or shapes of the first loop antenna and the second loop antenna are determined according to the set near-field communication distance.

5. The system of claim 1, wherein the first near-field communication antenna and the at least one second near-field communication antenna are arranged along a line and a distance between the first near-field communication antenna and the at least one second near-field communication antenna on two adjacent modules is within the set near-field communication distance.

6. The system of claim 1, wherein
the first near-field communication antenna includes a first printed circuit board having the first loop antenna printed thereon and the first printed circuit board is vertically fixed at one side edge of the main printed circuit board on the basic function module,
the at least one second near-field communication antenna includes two second printed circuit boards having the second loop antenna printed thereon and the two second printed circuit boards are respectively vertically fixed at two respective side edges of the main printed circuit board on a corresponding extended function module.

7. The system of claim 1, wherein
the first near-field communication antenna includes a first frame board with a first flexible printed circuit board attached an one side and two first connecting mechanisms,
the first loop antenna is printed on the first flexible printed circuit board,
the first frame board is vertically fixed by the two first connecting mechanisms at two side edges of the main printed circuit board of the basic function module, and
the at least one second near-field communication antenna includes a second frame board with a second flexible printed circuit board respectively attached on two opposite side surfaces and two second connecting mechanisms,
the second loop antenna is printed on the second flexible printed circuit board, and
the second frame board is vertically fixed by the two second connecting mechanisms at two side edges of the main printed circuit board of a corresponding extended function module.

8. The system of claim 7, wherein shapes of the first frame board and the second frame board match shapes of casings of the basic function module and the corresponding extended function module.

9. The system of claim 1, wherein
the at least one extended function module includes at least two extended function modules,
the basic function module and the at least two extended function modules are cascaded for communication,
each extended function module, of the at least two extended function modules, includes a communication destination determination device configured to determine a destination function module of downstream communication according to a data source of data to be sent in the extended function module, and
direct mutual communication is allowed only between adjacent extended function modules of cascaded extended function modules.

10. The system of claim 9, wherein the communication destination determination device is configured to determine the data source of data to be sent according to identification information identifying the data source of the data to be sent, and wherein the identification information is sent together with the data to be sent to a corresponding extended function module.

11. The system of claim 1, wherein the basic function module is a programmable logic controller module and wherein the at least one extended function module is a programmable logic controller module.

12. An extended function module, comprising:
at least one near-field communication transceiver; and
at least one near-field communication antenna, the at least one near-field communication antenna including two printed circuit boards having a loop antenna printed thereon, wherein the two printed circuit boards are respectively vertically fixed at two side edges of a main printed circuit board on the extended function module.

13. The extended function module of claim 12, wherein the loop antenna is a wiring loop formed by loop wiring along two side edges of a corresponding printed circuit board.

14. The extended function module of claim 13, wherein the extended function module is a programmable logic controller module.

15. The extended function module of claim 12, wherein the at least one near-field communication antenna includes a single loop antenna formed on the main printed circuit board.

16. The extended function module of claim 12, wherein the extended function module is a programmable logic controller module.

17. A basic function module, comprising:
a first near-field communication transceiver;
a first near-field communication antenna, the first near-field communication antenna including a first frame board with a first flexible printed circuit board attached on one side and two first connecting mechanisms, the first frame board vertically fixed by the two first connecting mechanisms at two side edges of a main printed circuit board of the basic function module; and
a first loop antenna printed on the first flexible printed circuit board.

18. The basic function module of claim 17, wherein the first loop antenna is a wiring loop formed by loop wiring along two side edges of the first flexible printed circuit board.

19. The basic function module of claim 18, wherein the basic function module is a programmable logic controller module.

20. The basic function module of claim 17, wherein the basic function module is a programmable logic controller module.

21. An extended function module, comprising:
at least one near-field communication transceiver; and
at least one near-field communication antenna, the at least one near-field communication antenna including a frame board with a flexible printed circuit board respectively attached on two opposite side surfaces and two connecting mechanisms, the frame board vertically fixed by use of the two connecting mechanisms at two side edges of a main printed circuit board of the extended function module; and
a loop antenna printed on the flexible printed circuit board.

* * * * *